United States Patent [19]

Weller

[11] 3,852,150

[45] Dec. 3, 1974

[54] RESILIENT ENERGY ABSORBING ASSEMBLY

[75] Inventor: Peter A. Weller, Durham, N.H.

[73] Assignee: McCord Corporation, Detroit, Mich.

[22] Filed: Jan. 15, 1973

[21] Appl. No.: 323,483

[52] U.S. Cl............... 161/96, 52/716, 161/118, 161/122, 161/144, 161/161, 267/140, 293/70, 293/71 R, 293/72, 293/98

[51] Int. Cl....... B32b 3/12, B32b 3/30, B60r 19/08

[58] Field of Search............ 52/167, 716; 161/5, 39, 161/55, 60, 68, 69, 77, 89, 96, 144, 159, 160, 161, 168, 170, 178, 118, 122; 260/2.5; 267/140, 141, 152, 153; 293/1, 71 R, 88, 92, 70, 72, 98

[56] References Cited
UNITED STATES PATENTS

| | | | |
|---|---|---|---|
| 1,974,279 | 9/1934 | Jones................................ | 161/69 X |
| 2,477,852 | 8/1949 | Bacon.............................. | 161/69 X |
| 2,493,032 | 1/1950 | Rheintrank, Jr...................... | 161/69 |
| 3,208,420 | 1/1973 | Niebylski......................... | 161/161 X |
| 3,506,295 | 4/1970 | Yancey............................. | 293/92 X |
| 3,575,896 | 4/1971 | Khan................................. | 260/2.5 |
| 3,635,784 | 1/1972 | Snitker............................. | 161/69 X |
| 3,644,168 | 2/1972 | Bonk et al. ..................... | 161/161 X |
| 3,666,310 | 5/1972 | Burgess et al..................... | 293/71 R |
| 3,717,223 | 2/1973 | Alfes................................. | 293/1 X |
| 3,809,420 | 5/1974 | Weller................................ | 293/70 |

Primary Examiner—M. Henson Wood, Jr.
Assistant Examiner—Howard Beltran
Attorney, Agent, or Firm—McGlynn and Milton

[57] ABSTRACT

An energy absorbing assembly comprising a network means embedded at least partially within a yieldable material which may be microcellular polyurethane foam. The network means comprises a plurality of integral sheets of material which are joined together to form a plurality of compartments. The integral sheets preferably overlap to form a plurality of substantially parallel elongated means joined together by link means also formed by the integral sheets.

18 Claims, 5 Drawing Figures

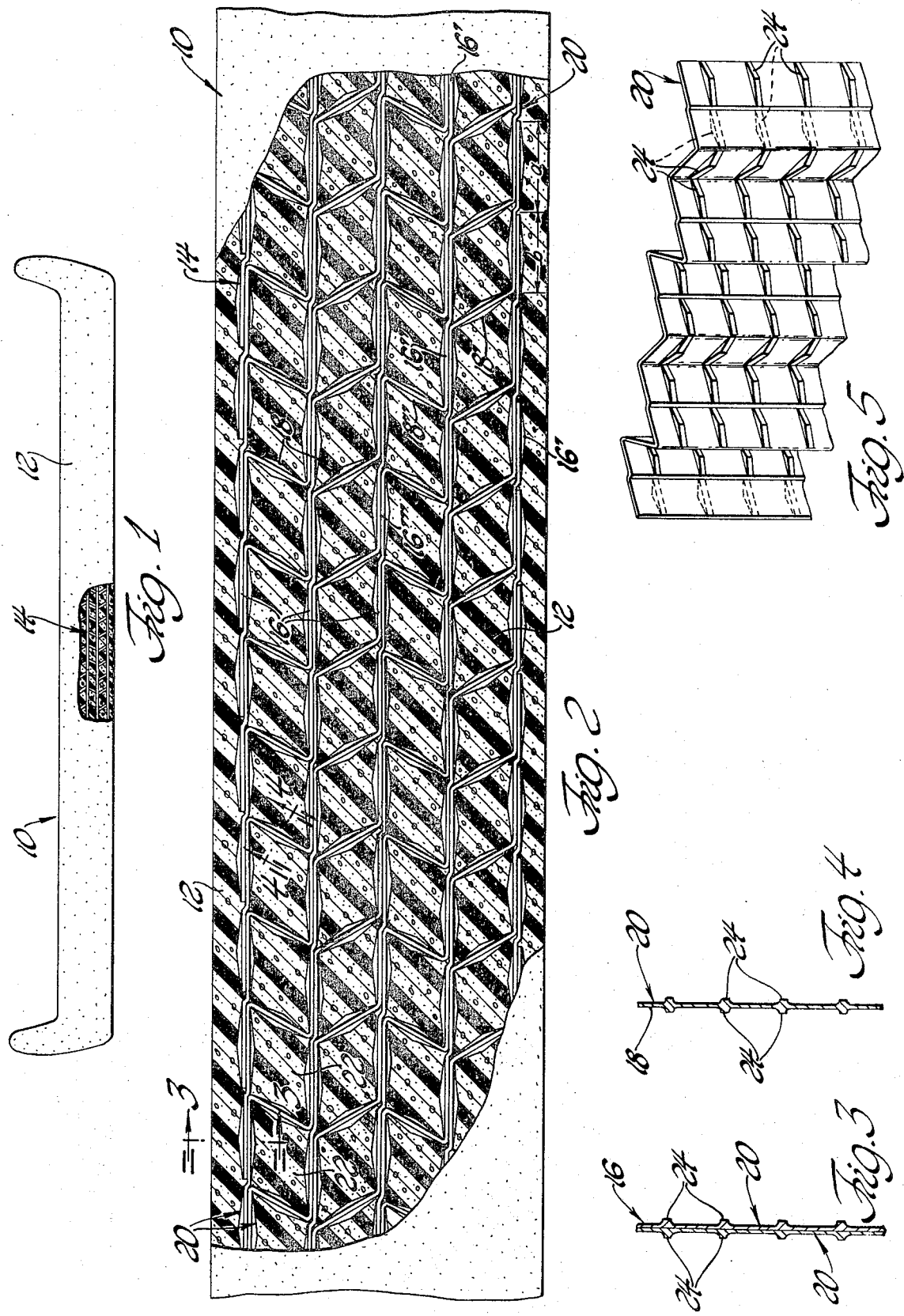

RESILIENT ENERGY ABSORBING ASSEMBLY

This invention relates to an energy absorbing bumper assembly and more particularly to an energy absorbing bumper assembly for vehicles, the assembly rendering a vehicle more safe by absorbing and distribution energy upon impact of the vehicle bumper with a foreign object.

Although particularly described with respect to energy absorbing bumper assemblies for automobiles, it will be appreciated that the invention has broader applications such as serving as an energy absorbing bumper assembly for all types of vehicles and vessels as well as buildings, docks, machines and any other structure for which protection from impact is desired.

There are numerous energy absorbing bumper assemblies known to the prior art and these assemblies employ various means for absorbing energy. Early bumpers consisted merely of a rigid bar or beam of metal rigidly mounted on the frame of an automobile. These bumpers, while providing some protection, served to reduce impact energy transmitted to the frame and occupants of a vehicle only slightly, if at all.

In an attempt to provide a bumper assembly better suited to absorb impact energy, assemblies comprising a resilient or deformable shock absorbing member affixed in some manner to the vehicle frame have been developed. However, such assemblies have several disadvantages, one of which is that only a portion of the bumper assembly absorbs the energy of impact. In other words, the impact force in a collision is normally localized at a given point on the bumper and the resultant localized compression of the deformable material at the point of impact transmits a substantial portion of the impact energy through the compressed padding to the automobile frame and, thus, to the occupants.

An example of one such prior art assembly is shown in U.S. Pat. No. 3,506,295 wherein a bumper is supported or attached to the frame of a vehicle through a sheet divided into rows of corrugations which deform upon movement of the bumper toward the frame. In such an assembly, the corrugations deform only in the area of impact with the bumper so that all of the energy is absorbed in a small area, whereby the deformable members may be completely deformed, resulting in a transmission of impact forces to the vehicle frame.

A further example of a bumper assembly employing a deformable shock absorbing material is the device disclosed by U.S. Pat. No. 3,666,310 to Burgess et al. This assembly provides a backing plate and an impact distribution plate in slidable engagement with each other and a core of microcellular polyurethane foam disposed therebetween. While this patent indicates that the device thereof is capable of absorbing substantial amounts of impact energy and distributing such energy across substantially the entire bumper, the distribution of energy is not efficient due to the fact that localized impact energy must be transmitted longitudinally of the bumper by a sole rigid impact distribution plate which is not movable in that longitudinal direction.

The present invention is directed to a particular type of energy absorbing bumper assembly comprising a novel combination of components at least partially embedded in energy absorbing yieldable material. The assembly of this invention serves to distribute the impact energy of a collision throughout a large volume of the energy absorbing yieldable material.

It has previously been found that the combination of a network embedded within a yieldable material produces results not expected from the mere combining of a network and yieldable materials such as elastomeric material. For example, even though a given network was found to collapse under a 5 pound load while a given elastomeric material collapsed under a 300 pound load, it was found that when the network was embedded in elastomer material, a 600 pound load was required to collapse the body.

The broad concept of embedding a network in a yieldable or elastomeric material is covered by my U.S. application Ser. No. 158,918 filed July 1, 1971, now U.S. Pat. No. 3,809,420, issued May 7, 1974. U.S. application Ser. No. 284,317 filed Aug. 28, 1972, of the same assignee is an improvement over the invention of Ser. No. 158,918 and provides a specific network means including a plurality of spaced elongated means, link means for connecting adjacent elongated means and joint means for facilitating relative angular movement therebetween. The instant invention is an improvement over the inventions of both of these applications.

It is an object of this invention to provide such an improved network means functioning in substantially the same manner as the network means of Ser. No. 284,317 but being formed by different structural members, said members facilitating the ease of forming the network means.

A more specific object of the invention is to form an energy absorbing assembly including yieldable material and network means embedded within said material, the network means including a plurality of integral sheets of material each joined at at least three spaced points with adjacent sheets to define a plurality of compartments.

A still more specific object of the invention is to form such an energy absorbing assembly wherein the network means includes at least two elongated means in substantially parallel spaced relationship and link means interconnecting the elongated means to define compartments, the elongated means and the link means being defined by a plurality of sheets of material each of which defines at least a portion of each of two adjacent elongated means and a link means extending therebetweeen.

Other objects and attendant advantages of the instant invention will be readily appreciated as the same becomes better understood by reference to the following detailed description when considered in connection with the accompanying drawings wherein;

FIG. 1 is a plan view of a bumper shell with a broken away section showing a network means embedded therein;

FIG. 2 is an enlarged view of the broken away portion of FIG. 1 showing the network means in more detail;

FIG. 3 is a cross-sectional view taken along line 3—3 of FIG. 2;

FIG. 4 is a cross-sectional view taken along lines 4—4 of FIG. 2; and

FIG. 5 is a perspective view of an integral sheet used to form the network means of FIG. 2.

Referring now to the drawings in more detail, an energy absorbing assembly is generally shown at 10 in FIGS. 1 and 2. The energy absorbing assembly 10 is indicated in FIG. 1 as a shell for a vehicle bumper. However, as indicated above, the assembly may be used to protect various structures. When used as a bumper, the shell of FIG. 1 is secured to the frame of the automobile by suitable known means, not shown.

The energy absorbing assembly 10 as shown in FIGS. 1 and 2 includes yieldable material 12 comprising a resilient or deformable material which will serve to transmit energy from impact throughout the bumper assembly. Any of the wellknown resilient elastomeric materials including natural and synthetic rubbers may be employed. Preferably, however, the yieldable material is a foamed plastic material. A preferred foamed plastic material is microcellular polyurethane foam, which is well-known in the prior art, having a thick skin which provides strength and surface protection. The microcellular foams produced by the preferred formulations possess thick sturdy skins which give the automotive bumper part added strength and protect the interior foam structure from damage upon impact; furthermore, the skins have no pores and are, therefore, easily painted. The preferred formulation for the microcellular polyurethane is disclosed in U.S. Pat. No. 3,575,896, patented Apr. 20, 1971, and assigned to the assignee of this application. That formulation calls for a microcellular polyurethane foam produced by reacting a prepolymer system which is made by reacting toluene diisocyanate with an organic diol and a catalyst system comprising a mixture of organic diols, blowing agent, an organo metallic catalyst, an aromatic amine and a hydroxy compound.

The yieldable material 12 used in forming the body of the energy absorbing assembly of this invention can be formed as by conventional casting and molding techniques to whatever shape is desired for the particular purpose. For example, as shown in FIG. 1 the yieldable material is cast in the shape of a bumper for an automobile.

Embedded within the yieldable material 12 is a network means generally shown at 14 which is designed to transmit energy generated by an impact of the assembly with a foreign object throughout the entire assembly such that the energy is transmitted evenly to the frame of the automobile or to whatever structure is being protected. The network means 14 comprises a plurality of integral sheets of material generally indicated at 20 each joined at at least three spaced points with adjacent sheets to define a plurality of compartments 22. More specifically, the network means 14 includes at least two elongated means indicated generally at 16 in substantially parallel spaced relationship and link means 18 interconnecting the elongated means. Thus, the elongated means 16 define substantially parallel walls running longitudinally through the yieldable material 12; therefore the elongated means 16 extend perpendicularly to any external force applied to the assembly.

The link members 18 are connected to elongated means at an acute angle and each of the elongated means 16 have link members 18 associated therewith and extending in the same general direction longitudinally thereof. That is, each of the elongated means 16 have the link members 18 extending from each side thereof and taking on the general appearance of a fish bone structure.

The combination of the elongated means 16 and the link members 18 defines a plurality of collapsible compartments 22 which collapse in response to an applied force and thereby compress the yieldable material 12 which is disposed therein. The energy absorbing function of the assembly is substantially due to the compression of the yieldable material 12 within the collapsing compartment 22; therefore, it is important that the network means 14 be capable of collapsing for the purpose of compressing the yieldable material 12 therein and also for distributing the energy generated by the applied force throughout a large volume of the yieldable material 12.

In the event that a vehicle equipped with the subject energy absorbing bumper 10 is involved in an impact, the elongated means 16 tend to move together so as to compress the yieldable material 12 therebetween. The link members 18 connecting the adjacent elongated means 16 restrict the movement of the yieldable material 12 within the compartments while being connected to the elongated means 16 in such a manner as to promote relative angular movement of the link members 18 with respect to the elongated means 15. Thus, the construction of the assembly 10 allows the elongated means 16 to move toward each other to compress the yieldable material 12 therebetween and to absorb energy. It should be noted that as the link members 18 undergo relative angular movement with respect to the elongated means 16 the elongated means will be moved in a longitudinal direction as the network 14 collapses, each elongated means 16 moving in the direction opposite of its adjacent elongated means. Thus, not only is the energy distributed by the elongated means 16 being compressed into closer relationship to each other, but also by the elongated means 16 moving longitudinally to thereby distribute the impact energy throughout the length of the bumper assembly 10.

The elongated means 16 and the link members 18 of the network 14 are defined by a plurality of sheets of material 20 each of which defines a portion of each of two adjacent elongated means 16 and a link means 18 extending therebetween. In the preferred embodiment adjacent sheets 20 overlap to form the elongated means 16. Thus, each elongated means 16 of the network means 14 of this invention is a composite of a number of overlapping sheets 20 rather than a unitary member as is the case in Ser. No. 284,317.

Each sheet 20 overlaps an adjacent sheet on one side thereof along a first distance a along a first elongated means 16' and then overlaps another adjacent sheet on the opposite side thereof along a second distance b which follows said first distance. As can be seen from FIG. 2, each sheet 20 extends along a first elongated means 16' in overlapping relationship such as shown at a and b and then through a first link means 18' inclined forwardly to a second elongated means 16'' where the sheet 20 once again includes a first section extending along said second elongated means 16'' from said first link means a first distance in overlapping relationship with an adjacent sheet 20 which is one side thereof opposite to said first link means 18' and a second section extending a second distance to said second link means 18'' in overlapping relationship with another adjacent sheet 20 which is on the same side thereof as said first link menas 18'. Subsequent to passsing through and forming a portion of the second elongaged means 16'' in overlapping relationship with adjacent sheets 20, the sheet 20 then moves through a second link means 18'' inclined rearwardly to a third elongated means 16''' where once again the sheet 20 is in overlapping relationship with adjacent sheets 20 to form part of the third elongated means 16'''.

Each of the plurality of integral sheets 20 is formed individually. The sheets 20 may be formed of any material which will afford the desired flexibility as well as the strength to maintain the integrity of the network means 14 within the yieldable material 12 upon impact. It is important that the integral sheets 20 be sufficiently flexible so as to afford the desired compressibility of the network means since if the network means 14 were rigidly constructed such that it did not have the ability to pivot or move angularly, thereby preventing the collapse of the compartments, the network means 14 would stiffen the resilient means 12 to such an extent that it would no longer be capable of absorbing the energy of the impact. Furthermore, the network means 14 would be taking the brunt of the force rather than distributing the energy throughout the yieldable material 12.

The integral sheets 20 are preferably formed of plastic, the particular plastic composition being selected to afford the degree of flexibility and strength characteristics desired for the individual assembly. The sheets 20, when formed of plastic, may be conveniently molded, preferably by injection molding. To this end various plastic materials which are readily injection molded are available and known to the prior art. Among the many plastic materials which are suitable for injection molding are polyethylene, polystyrene and styrene copolymers.

The individual sheets 20 which are disposed in overlapping relationship as discussed above are secured to adjacent sheets in any suitable manner. However, it is preferred that the integral sheets 20 be secured to adjacent sheets along the elongated means 16 by bonding. Although the bonding may be done by using an adhesive, it is preferred when the integral sheets 20 are formed of plastic to autogenously bond the overlapping sections thereof to form the network means 14. Of course, autogenous bonding techniques are wellknown and include such methods as heating thermoplastic materials to render them tacky and then pressing together, solvent bonding techniques and sonic bonding, to name but a few.

It will be appreciated that the network means 14 of this invention may be formed in a more expeditious and less expensive manner than that of Ser. No. 284,317. By forming individual sheets 20 and subsequently assembling the same the expensive and time consuming process of forming or molding the entire assembly as is the case in the first embodiment of the above-identified application is avoided. Also, the assembly of this invention does not require particular joint means and link members as called for by the second embodiment of Ser. No. 284,317.

Preferably each integral sheet 20 includes reinforcing ribs 24. As shown most clearly in FIG. 5, each sheet includes first and second sections $a$ and $b$ respectively which correspond to sections $a$ and $b$ of elongated means 16' in FIG. 2. The first section $a$ includes a plurality of reinforcing ribs on one side thereof while the second section $b$ following said first section includes reinforcing ribs on the side opposite the reinforcing ribs of said first section. A third section $c$ follows said second section and includes reinforcing ribs on both sides thereof. Each integral sheet 20 is formed with a repeating pattern of sections $a$, $b$ and $c$. The portion of each sheet having ribs on both sides thereof forms a link means 18. As shown in FIG. 4, a section taken along line 4—4 of FIG. 2, the link means 18 comprises a single thickness sheet having a plurality of spaced ribs 24 on both sides thereof, the ribs being spaced such that they are opposite corresponding ribs on the other side of the link means 18.

The sections a and b of each integral sheet each form part of an elongated means 16 by overlapping with adjacent sheets. As can be noted from FIG. 2, the ribs of section a of the integral sheet 20 forming the elongated means 16 are on the side opposite the link means 18' and the ribs on the second section b of the integral sheet 20 forming part of the elongated means 16' are on the same side of the elongated means as the link means 18'. FIG. 3 shows a cross section of an elongated means 16 taken along line 3—3 of FIG. 2. As can be seen in this FIGURE each elongated means 16 is formed of overlapping adjacent integral sheets 20 with ribs 24 on only one side thereof, said ribs being spaced such that they correspond with ribs on adjacent sheets 20.

The ribs on the elongated means 16 and link means 18 of the network means 14 not only provide additional reinforcement to the network means 14 and additional surface area to which the foamed plastic may be bonded, but also provide a means for allowing the network means 14 and elongated means 16 to move with respect to each other at predetermined points. Thus, as seen in FIGS. 2 and 5 the ribs 24 narrow down toward the edges thereof such that the sheet is bendable at the point where the sets of ribs 24 come together between sections.

The invention has been described in an illustrative manner and it is to be understood that the terminology which has been used is intended to be in the nature of words of description rather than limitation.

Obviously, many modifications and variations of the present invention are possible in light of the above teachings. It is, therefore, to be understood that the invention may be practiced otherwise than as specifically described above within the scope of the appended claims.

The embodiments of the invention in which an exclusive property or privilege is claimed are defined as follows:

1. An energy absorbing assembly comprising: yieldable material; and composite network means embedded within said material, said composite network means including a plurality of integral sheets of material each joined at at least three spaced points with adjacent sheets to define a plurality of compartments, said composite network means including at least two elongated means in substantially parallel spaced relationship and link means interconnecting said elongated means to define said compartments, said elongated means and said link means being defined by said plurality of sheets of material each of which defines at least a portion of each of two adjacent elongated means and a link means extending therebetween each sheet extending along a first elongated means and through a first link means inclined forwardly to a second elongated means and then through a second link means inclined rearwardly to a third elongated means.

2. An assembly as set forth in claim 1, wherein adjacent sheets overlap along said elongated means.

3. An assembly as set forth in claim 1, wherein each sheet overlaps an adjacent sheet on one side thereof a first distance along a first elongated means and then overlaps another adjacent sheet on the opposite side thereof along a second distance which follows said first distance, 4. An assembly as set forth in claim 1, wherein said sheets are plastic.

5. An assembly as set forth in claim 1, wherein said sheet includes a first section extending along said second elongated means from said first link means a first distance in overlapping relationship with an adjacent sheet on the side thereof opposite to said first link means and a second section extending a second distance to said second link means in overlapping relationship with another adjacent sheet on the same side thereof as said first link means.

6. An assembly as set forth in claim 5, wherein each sheet includes reinforcing ribs.

7. An assembly as set forth in claim 6, wherein there are ribs on each side of each link means.

8. An assembly as set forth in claim 7, wherein there are ribs on said first section on the same side thereof as said first link mans and on said second section on the side thereof opposite to said first link means.

9. An assembly as set forth in claim 8, wherein said sheets are plastic.

10. An assembly as set forth in claim 9, wherein said sheets are autogenously bonded.

11. An assembly as set forth in claim 10, wherein said yieldable material is a foamed plastic.

12. An assembly as set forth in claim 11, wherein said foamed plastic is microcellular polyurethane foam.

13. An energy absorbing assembly comprising a composite network means including a plurality of integral sheets of material each joined at at least three spaced points with adjacent sheets to define a plurality of compartments, said composite network including at least two elongated means in substantially parallel spaced relationship and link means interconnecting said elongated means to define said compartments, said elongated means and said link means being defined by a plurality of sheets of material each of which defines at least a portion of two adjacent elongated means and a link means extending therebetween, each sheet extending along a first elongated means and through a first link means inclined forwardly to a second elongated means and then through a second link means inclined rearwardly to a third elongated means.

14. An assembly as set forth in claim 13, wherein said sheet includes a first section extending along said second elongated means from said first link means a first distance in overlapping relationship with an adjacent sheet on the side thereof opposite to said first link means and a second section extending a second distance to said second link means in overlapping relationship with another adjacent sheet on the same side thereof as said first link means.

15. An assembly as set forth in claim 14, wherein said sheets of material are plastic.

16. An assembly as set forth in claim 15, wherein said sheets are autogenously bonded.

17. An elongated sheet of material comprising: a first section extending along said sheet and including reinforcing ribs on one side thereof; a second section extending along said sheet following said first section and including reinforcing ribs on the side opposite the reinforcing ribs of said first section; and a third section extending along said sheet following said second section and including reinforcing ribs on both sides thereof, said reinforcing ribs in each section being spaced from one another across said sheet.

18. An assembly as set forth in claim 17, wherein said material is plastic.

* * * * *